United States Patent [19]
Boehringer

[11] 3,889,789

[45] June 17, 1975

[54] THERMAL FUSE MECHANICAL DISCONNECT

[75] Inventor: Wilfred E. Boehringer, Fullerton, Calif.

[73] Assignee: McDonnell Douglas Corporation, Santa Monica, Calif.

[22] Filed: Apr. 15, 1974

[21] Appl. No.: 460,920

[52] U.S. Cl. ............ 192/82 T; 64/28 R; 192/56 R; 403/32
[51] Int. Cl. ........................................... F16d 11/00
[58] Field of Search ............ 192/82 T, 56 R, 91 A; 64/28 R; 403/28, 32

[56] References Cited
UNITED STATES PATENTS

| | | | |
|---|---|---|---|
| 2,210,976 | 8/1940 | Hallinan | 192/82 T |
| 2,224,440 | 12/1940 | Lewis | 192/56 R |
| 2,314,227 | 3/1943 | Lieberherr | 192/82 T |
| 2,539,534 | 1/1951 | Eckhardt | 192/82 T |
| 2,838,920 | 6/1958 | Hill, Jr. et al. | 64/28 R |
| 3,212,613 | 10/1965 | Carlson | 192/82 T |
| 3,675,444 | 7/1972 | Whipple | 64/28 R |

Primary Examiner—Samuel Scott
Assistant Examiner—Randall Heald
Attorney, Agent, or Firm—G. W. Finch; W. J. Jason; D. L. Royer

[57] ABSTRACT

A rotary drive shaft disconnect mechanism which mechanically joins two aligned shafts and which disconnects them in response to the overheating of a component element. The mechanism generally comprises two axially aligned, abutting hollow cylindrical elements which are mounted for axial sliding in the driving and driven power shafts. The abutting ends of the cylinders are formed with matching teeth which are maintained in engagement by a preloaded compressive force. Suitable load carrying structure is provided within the cylinders so that a heat responsive fuse transfers the preload compressive force until such time as heat causes the fuse to fail. The fuse is comprised of multiple structural wires which are the elements thereof which transfer the compressive preload. The wires are enclosed in an eutectic matrix. The heat from an overheating component is transmitted to the eutectic which liquefies and removes the side support from the wires which then fail in a columnar bending mode, removing the load path for the compressive preload which allows the disconnection.

10 Claims, 2 Drawing Figures

THERMAL FUSE MECHANICAL DISCONNECT

BACKGROUND OF THE INVENTION

Contemporary aircraft use many hydraulic pumps to provide the necessary horsepower to drive flight controls as well as other hydraulic systems throughout the aircraft. To provide this power, more than one pump is usually used per hydraulic system so that if one pump fails the other pump or pumps can provide the needed hydraulic energy into the system. It is important to detect a failing hydraulic pump and uncouple it from its driving source as quickly as possible since a failing pump generates heat which will quickly overheat itself. When the pump's temperature reaches a critical point its lubrication completely breaks down and it gradually wears itself to pieces resulting in a complete hydraulic system loss when a high flow rate leak finally develops. It has also been found that when a hydraulic pump is an advanced failure mode heats up the hydraulic fluid, gaseous vapor is formed at the pump and is driven back into the suction line. Any pump supplied from this common suction line will starve, cavitate and also fail.

When the hydraulic pumps fail and there are no means to uncouple them from their driving sources, the pumps tend to completely destroy themselves, charring the hydraulic fluids and requiring the complete replacement and disposal of the failed pump and an extensive clean-up before a new pump can be installed in the system. If means are provided to sense a degenerating hydraulic pump by its increasing temperature and decouple it from its driving source before its temperature reaches a point where lubrication breaks down and internal annihilation starts, in many instances the pump can be repaired in a relatively short time and no system clean-up is required. Therefore the aircraft is out of service only as long as it takes maintenance personnel to switch pumps on the aircraft.

SUMMARY OF THE INVENTION

The present thermal fuse means was designed to provide a temperature sensing device that automatically disconnects a pump drive shaft from its driving source if the temperature of the pump exceeds a predetermined value. The pump drive shaft, which must be disconnected, is made up of two major spline driven members that connect to each other through a ring of curvical gear teeth. The shape of the teeth are such that when torque is transmitted from the spline of the motor to the spline of the pump, the members tend to separate. This separating force is required to slip the splines against the loaded spline friction. To prevent the curvical teeth from failing in fatigue, it is mandatory that they maintain a predetermined preload engagement. The engagement preload is maintained by a force applied through the thermal fuse. The thermal fuse is ring-shaped having a plurality of axially aligned structural wires cast into a slug of eutectic material. The wires extend to the side faces of the fuse and are supported in their column positions by the surrounding eutectic material so they can take the compressive loads as columns. The wires, when supported in column, transfer the high compressive loads needed to maintain the curvical teeth with the proper preload whereas if eutectic material alone was used, it would creep or extrude under the sustained compressive stress and the result would be an inoperative device.

When the eutectic is melted by the heat of an overheating pump, it removes the stabilizing side support for the wire columns which collapse under the compressive load. With the slug melted away, the axial load generated by the curvical teeth and an internal spring separates the spline members thereby disconnecting the drive from the driven. As long as a pump does not overheat, the addition of the fuse does not effect the driving capability of the two major spline members so that the desired torque can be transferred therebetween.

It is therefore an object of the present invention to provide means to disconnect a driven device when such device overheats during impending failure.

Another object of the present invention is to provide means to prevent the loss of aircraft hydraulic systems due to the failure of a single pump.

Another object is to provide means which disconnect hydraulic pumps that are in a minor failure mode so that a major failure mode does not develop to destroy the pump.

Another object is to improve the economic operation of aircraft by preventing the destruction of their expensive hydraulic pumps.

Another object is to increase the safety factor in contemporary aircraft.

Another object is to provide a thermal fuse and arrangement therefor which allows the transfer of torque from a driving element to a driven element until a predetermined temperature is reached at which point no further torque is transmitted.

Another object is to provide an eutectic fuse which will not creep or extrude under sustained compressive stress.

These and other objects and advantages of the present invention will become apparent to those skilled in the art after considering the following detailed specification which covers a preferred embodiment thereof in conjunction with the accompanying drawing wherein:

DESCRIPTION OF THE PRESENT EMBODIMENT

Figure 1:
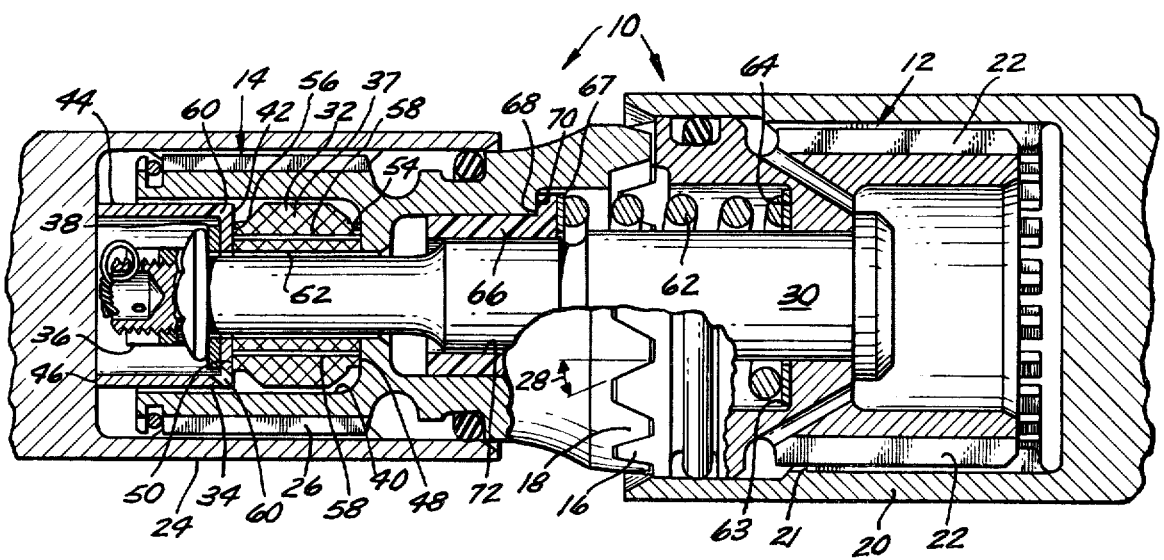
FIG. 1 is a cross-sectional side view of the present invention in a condition to transfer torque from a driving element to a driven element.

Referring to the drawing more particularly by reference numbers, number 10 in FIG. 1 refers to a thermally fused, drive shaft assembly constructed acccording to the present invention. The assembly 10 includes two spline assemblies 12 and 14 which are connected together by mating curvical gear teeth 16 and 18. The spline assembly 12 as shown is driven by an internally splined engine drive shaft 20 whose splines 21 mate with the splines 22 on the spline assembly 12. Likewise, spline assembly 14 drives internally splined pump drive shaft 24 by means of splines 26 thereabout. As long as the curvical gear teeth 16 and 18 are maintained in the engaged position shown in FIG. 1, torque can be transferred from the engine drive shaft 20 to the pump drive shaft 24 to drive the pump connected thereto. If the pump (not shown) begins to fail, its temperature will rise and its pump drive shaft 24 will transfer this heat to the drive shaft assembly 10.

The curvical gear teeth 16 and 18 have a predetermined wedge angle 28 which has a tendency to force them axially apart when torque is applied thereacross, therefore means must be provided to establish a compressive force therebetween to maintain the teeth 16 and 18 in the desired torque transmitting position. This compressive force between the spline assemblies 12 and 14 is provided by means of a center shaft 30 which is normally brazed or otherwise permanently attached to the center of the spline member 12. The shaft extends axially through the spline member 14, a thermal fuse 32 and a cap member 34. A safety tieable nut 36 and a Bellville washer 38 are included on the end of the shaft 30 which extends toward the pump. When torqued down, the nut 36 and the Bellville washer 38 apply the needed compressive force to the teeth 18 and 16. The compressive force is transferred from the spline member 12 through its center shaft 30 to the nut 36 and hence to the Bellville washer 38 and the cap member 34. The cap member 34 presses on the fuse 32 which is compressed in a diametral bore 40 in the spline assembly 14. The cap includes a portion 42 which extends radially outward from the shaft 30 and a cylindrical portion 44 which extends axially toward the pump from the radial portion 42. The cylindrical portion 44 is a close fit in the diametral bore 40 of the spline assembly 14 and is used to stabilize the pump end of the shaft 30 while providing a heat conduction path to the thermal fuse 32 from the pump drive shaft 24 which is contacts at its end 46.

The thermal fuse 32 is made from eutectic material 37 such as the eutectic alloy comprised of 62.5 percent tin, 36.1 percent lead and 1.4 percent silver alloy which melts at 354°F a temperature below the temperature at which lubrication qualities of the normally used aircraft hydraulic fluids cease to exist. The thermal fuse 32, as shown, is ring-shaped, having parallel side surfaces 48 and 50 which are perpendicular to its axial bore 52. The bore 52 provides clearance for the shaft 30 to extend through the fuse 32. The side surface 48 of the fuse abuts a radial abutment surface 54 at the inner end of the diametral bore 40 while the opposite side surface 50 abuts the radial face 56 of the radially extending portion 42 of the cap 34. The eutectic material 37 of the fuse 32, constrained as it is in the diametral bore 40 between the abutment surface 54 and radial face 56, would creep under the sustained compressive loads which must be maintained to maintain the teeth 16 and 18 in engagement. Therefore, columnar supports, such as the steel wire supports 58 shown, are provided which run at right angles from side surface 48 to side surface 50. The number of steel wire columns 58 employed is dependent upon the total amount of compressive force that must be sustained through the thermal fuse 32. The Bellville washer 38 absorbs any initial creep of the fuse 32 after it is installed. The initial creep is caused by the eutectic material 37 compressing slightly to enable the wire columns 58 to take up the load.

Figure 2:
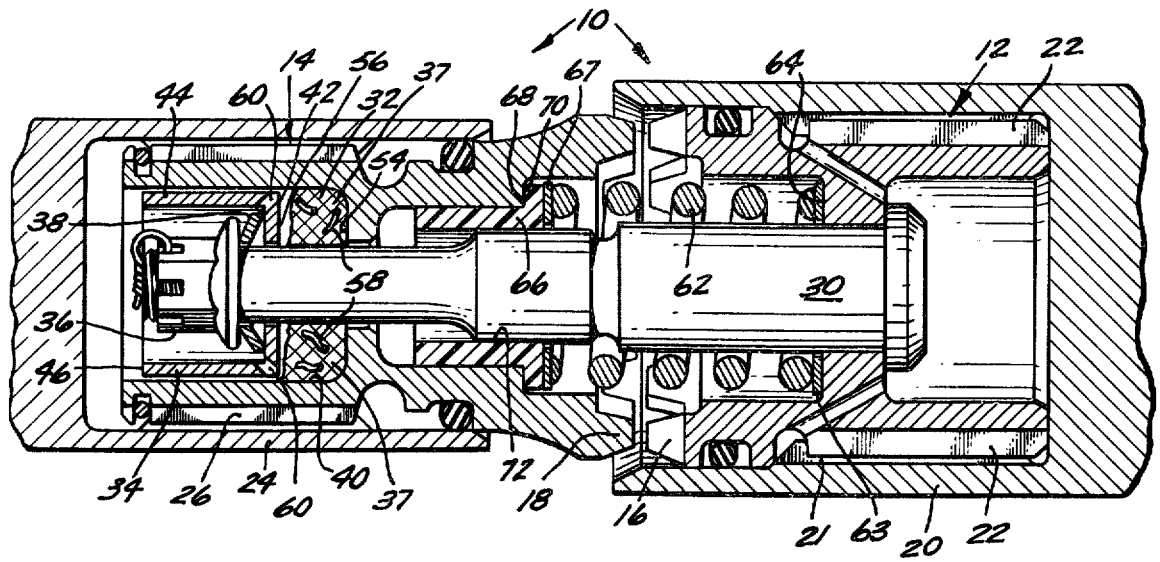
FIG. 2 is a cross-sectional view of the device of FIG. 1 once the fuse has melted and the driven element is decoupled from the driving element.

When the heat of a failing pump is transferred to the thermal fuse 32, the eutectic material 37 melts and some of it flows out through holes 60 in the radial portion 42 of the cap 34 provided for that purpose. The eutectic material 37 normally supports the steel wire columns 58 to prevent columnar bending and when the eutectic material 37 melts such support is lost. The loss of support allows the compressive force to collapse the columns 58 thereby relieving the compressive force between the teeth 16 and 18 which therefore disengage. This is shown in FIG. 2.

A compressed spring 62 is provided to maintain complete disengagement of the teeth 16 and 18. The spring 62 is normally maintained in a preloaded condition as shown in FIG. 1 so that when the fuse 32 melts, the spring assists the angle 28 of the gear teeth 16 and 18 to disengage and maintain disengagement of the teeth. Undesired re-engagement of the teeth on an occasional basis would cause wear and perhaps destruction thereof, necessitating the replacement of the complete shaft assembly 10. One one end, the spring 62 abuts a washer 63 resting on an internal flange 64 in the spline member 12 while on the other end it abuts a self-lubricating bushing 66 protected by washer 67. The bushing 66 includes a radial surface 68 for abutting a matching internal flange 70 in the spline member 14. Normally the bushing 66 is constructed from material like hard carbon and is press fit into the spline member 14. The bushing 66 also includes an internal cylindrical portion 72 which provides the bearing surface needed between the spline member 14 and the shaft 30 so that when the members 12 and 14 are disengaged, the relative rotation therebetween can be accommodated.

Thus there has been shown and described a novel thermally fused drive shaft assembly and the fuse therefor which fulfills all of the objects and advantages sought therefor. Any changes, modifications, variations and other uses and applications of the subject thermally fused drive shaft assembly and fuse will, however, become apparent to those skilled in the art after considering the specification and the accompanying drawing. All such changes, modifications, alterations and other uses and applications which do not depart from the spirit and scope of the invention are deemed to be covered by the invention which is limited only by the claims which follow.

What is claimed is:

1. Torque disconnect means including:

first means for connecting to torque supplying means;

second means for connecting to torque receiving means; and third means for connecting and disconnecting said first and second means in torque transmitting relationship, said third means including bias means tending to force said first and second means to disconnect positions and a thermal fuse loaded in compression by said bias means, said thermal fuse including a body having opposite parallel abutment faces to which said bias means apply the compressive load, said thermal fuse body being constructed of fuse material which remains solid up to a predetermined temperature and a plurality of columnar supporting members which extend perpendicular to and between said abutment faces, whereby said fuse material prevents columnar bending of said supporting members until the predetermined temperature is reached, at which time the compressive load fails said supporting members in columnar bending so that said thermal fuse no longer resists said bias means, thereby allowing said bias means to disconnect said first and second means.

2. The torque disconnect means defined in claim 1 wherein said thermal fuse body includes:

an inner cylindrical surface defining a bore therethrough, and said third means include:

a shaft having opposite ends, said shaft extending through the bore in said thermal fuse body and connected at an end thereof to said first means; and an abutment member connected on the opposite end of said shaft, said abutment member abutting one of said thermal fuse faces to apply the compressive load thereto.

3. The torque disconnect means defined in claim 2 wherein said second means include:

an abutment surface for abutment with the other of said thermal fuse faces to apply the compressive load thereto.

4. The torque disconnect means defined in claim 3 wherein said third means include:

curvical gear teeth on said first means facing said second means; and curvical gear teeth on said second means facing said first means, said curvical gear teeth having mating shapes and being maintained in engagement by the compresive load, said curvical gear teeth being shaped to generate additional compressive load when torque is being transmitted between said first and second means.

5. The torque disconnect means defined in claim 4 wherein said bias means include:

a spring compressed between said first and second means tending to force said curvical gear teeth apart.

6. The torque disconnect means defined in claim 5 wherein said abutment member is in heat transfer relationship with the torque receiving means, whereby the heat in the torque receiving means is transferred to the thermal fuse body material in abutment therewith.

7. The torque disconnect means defined in claim 6 wherein said first means include:

means for sliding engagement with the torque supplying means, said means for sliding engagement allowing said first means curvical gear teeth to move out of engagement with said second means curvical gear teeth.

8. The torque disconnect means defined in claim 7 wherein said abutment member defines passages therethrough, whereby said body material can flow through the passages of said abutment member to assure said body material allows said bias means to disconnect said curvical gear teeth.

9. The torque disconnect means defined in claim 8 wherein said shaft includes:

a nut threadably connected thereto; and a spring washer, whereby said abutment member is connected to said shaft to apply compressive load by means of said nut and said spring washer which is positioned therebetween, said spring washer assuring a predetermined compressive force is applied across said thermal fuse when said nut is tightened.

10. The torque disconnect means defined in claim 9 wherein said second means include:

a bearing connected to said second means, said bearing supporting a portion of said shaft for rotation and one end of said spring thereby enabling relative rotation between said first and second means when disconnected.

* * * * *